United States Patent [19]

Brueggemann

[11] Patent Number: 5,247,383

[45] Date of Patent: Sep. 21, 1993

[54] SCANNER WITH A POST FACET LENS SYSTEM

[75] Inventor: Harry P. Brueggemann, San Marino, Calif.

[73] Assignee: Olive Tree Technology, Inc., Calif.

[21] Appl. No.: 774,565

[22] Filed: Oct. 9, 1991

Related U.S. Application Data

[63] Continuation-in-part of Ser. No. 496,459, Mar. 20, 1990, abandoned.

[51] Int. Cl.$^5$ .................. G02B 26/08; G02B 3/00
[52] U.S. Cl. .................. 359/197; 359/206; 359/662
[58] Field of Search .................. 350/6.1–6.91, 350/413, 433, 434; 358/300, 481, 95–107; 359/662, 797, 196–226, 362, 642; 250/235, 201

[56] References Cited

U.S. PATENT DOCUMENTS

| | | | |
|---|---|---|---|
| 2,966,823 | 1/1961 | Trimble | 350/434 |
| 3,675,016 | 7/1972 | Blaisdell et al. | 350/6.7 |
| 3,750,189 | 7/1973 | Fleischer | 350/433 |
| 3,751,587 | 8/1973 | Insler et al. | 358/481 |
| 3,865,465 | 2/1975 | Tatuoka et al. | 350/6.8 |
| 3,867,571 | 2/1975 | Starkweather et al. | 350/486 |
| 3,870,394 | 3/1975 | Ploeckl | 350/6.8 |
| 3,890,034 | 6/1975 | Ploeckl | 350/6.8 |
| 3,922,485 | 11/1975 | Starkweather et al. | 350/6.8 |
| 3,938,881 | 2/1976 | Biegelsen et al. | 350/358 |
| 3,944,323 | 3/1976 | Starkweather | 350/6.6 |
| 3,970,359 | 7/1976 | Starkweather | 350/6.8 |
| 3,973,825 | 8/1976 | Starkweather | 350/6.8 |
| 3,974,506 | 8/1976 | Starkweather | 358/300 |
| 3,995,110 | 11/1976 | Starkweather | 358/481 |
| 4,002,830 | 1/1977 | Brown et al. | 358/481 |
| 4,015,081 | 3/1977 | Starkweather | 358/206 |
| 4,027,961 | 6/1977 | Starkweather | 355/202 |
| 4,034,408 | 7/1977 | Starkweather | 358/481 |
| 4,040,096 | 8/1977 | Starkweather | 358/302 |
| 4,080,633 | 3/1978 | Starkweather | 358/481 |
| 4,084,197 | 4/1978 | Starkweather | 358/300 |
| 4,108,532 | 8/1978 | Minoura | 350/6.6 |
| 4,121,883 | 10/1978 | Goshima et al. | 350/6.8 |
| 4,179,183 | 12/1979 | Tateoka et al. | 350/6.1 |
| 4,213,157 | 7/1980 | DeBenedictis et al. | 358/293 |
| 4,230,394 | 10/1980 | Brueggemann et al. | 350/6.8 |
| 4,247,160 | 1/1981 | Brueggemann | 350/6.8 |
| 4,274,703 | 6/1981 | Fisli | 350/6.8 |
| 4,277,128 | 7/1981 | Kawamura | 350/6.8 |
| 4,284,994 | 8/1981 | Radl | 350/6.8 |
| 4,304,459 | 12/1981 | Kramer | 350/3.71 |

(List continued on next page.)

FOREIGN PATENT DOCUMENTS 92714  4/1989  Japan .................. 359/205

Primary Examiner—Bruce Y. Arnold
Assistant Examiner—Thong Nguyen
Attorney, Agent, or Firm—Matthew F. Jodziewicz

[57] ABSTRACT

A scanner system includes a light source for producing a light beam and a multifaceted polygon for scanning the light beam in a scan plane along a scan line a predetermined distance from the polygon, such as at the surface of a photoreceptor or a document to be read. The system also includes a post-facet lens system that includes first and second elements configured to compensate for field curvature and wobble without compensating for scanner non-linearity. Preferably, the first element and second elements are so disposed that the light beam passes first through the first element and then through the second element. In addition, the first element preferably includes first and second surfaces such that the light beam passes from the first surface to the second surface, the first surface being spherical and the second surface being cylindrical with curvature in the scan plane and essential no curvature in the cross-scan plane. Furthermore, the second element preferably includes first and second surfaces such that the light beam passes from the first surface to the second surface, the first surface being spherical and the second surface being toroidal with a first curvature in the scan plane and a second curvature in the cross-scan plane.

2 Claims, 2 Drawing Sheets

U.S. PATENT DOCUMENTS

| | | | |
|---|---|---|---|
| 4,319,807 | 3/1982 | Horton | 350/6.4 |
| 4,379,612 | 4/1983 | Matsuoka et al. | 350/6.8 |
| 4,397,521 | 8/1983 | Antos et al. | 350/6.8 |
| 4,443,055 | 4/1984 | Matsuoka et al. | 350/6.5 |
| 4,447,112 | 5/1984 | Matsuoka et al. | 350/6.5 |
| 4,475,787 | 10/1984 | Starkweather | 350/6.4 |
| 4,496,209 | 1/1985 | Itoh et al. | 350/6.8 |
| 4,512,625 | 4/1985 | Brueggemann | 350/6.8 |
| 4,523,801 | 6/1985 | Baba et al. | 350/6.8 |
| 4,538,895 | 9/1985 | Higgins et al. | 355/3 R |
| 4,565,421 | 1/1986 | Minoura | 350/6.8 |
| 4,571,021 | 2/1986 | Minoura et al. | 350/6.8 |
| 4,585,296 | 4/1986 | Minoura et al. | 350/6.5 |
| 4,595,947 | 6/1986 | Brueggemann | 358/75 |
| 4,606,601 | 8/1986 | Starkweather | 350/6.4 |
| 4,624,528 | 11/1986 | Brueggemann | 350/6.7 |
| 4,639,072 | 1/1987 | Itoh et al. | 350/6.8 |
| 4,662,709 | 5/1987 | Brueggemann | 350/6.7 |
| 4,674,825 | 6/1987 | Tateoka et al. | 350/6.8 |
| 4,682,842 | 7/1987 | Brueggemann | 350/6.7 |
| 4,712,884 | 12/1987 | Sakuma et al. | 350/434 |
| 4,715,699 | 12/1987 | Morimoto | 350/6.8 |
| 4,719,515 | 1/1988 | Miyagawa et al. | 358/268 |
| 4,720,632 | 1/1988 | Kaneko | 250/235 |
| 4,729,617 | 3/1988 | Shimada et al. | 359/205 |
| 4,756,583 | 7/1988 | Morimoto | 350/6.5 |
| 4,756,584 | 7/1988 | Takanashi | 350/6.8 |
| 4,756,585 | 7/1988 | Kaneko et al. | 350/6.8 |
| 4,786,151 | 11/1988 | Hamada | 350/434 |
| 4,789,230 | 12/1988 | Ohta | 350/6.8 |
| 4,796,962 | 1/1989 | DeJager et al. | 359/206 |
| 4,799,747 | 1/1989 | Yamakawa | 350/6.8 |
| 4,802,721 | 2/1989 | Fujita | 350/6.8 |
| 4,805,974 | 2/1989 | Brueggemann et al. | 350/6.7 |
| 4,818,046 | 4/1989 | Kondo | 350/6.8 |
| 4,850,663 | 7/1989 | Yamamoto et al. | 350/6.8 |
| 4,882,490 | 11/1989 | Takasaki | 250/236 |
| 4,898,437 | 2/1990 | Brueggemann | 350/6.7 |
| 4,900,138 | 2/1990 | Atkinson, III et al. | 350/413 |
| 4,940,310 | 7/1990 | Hamada | 250/236 |
| 4,941,719 | 7/1990 | Hisada | 350/6.8 |
| 4,950,889 | 8/1990 | Budd | 250/236 |
| 5,095,383 | 3/1992 | Omura et al. | 359/196 |

SCANNER WITH A POST FACET LENS SYSTEM

This is a continuation-in-part of copending application Ser. No. 07/496,459 filed on Mar. 20, 1990 now abandoned.

BACKGROUND OF THE INVENTION

1. Technical Field

This invention relates generally to input and output scanners, and more particularly to such a scanner having a multifaceted rotating polygon that directs a beam of light through a post-facet lens system toward a surface to be scanned.

2. Background Information

A multifaceted rotating polygon can appear to wobble. That is because not all facets are exactly parallel to the axis of rotation and that bearing free play can cause the axis to tilt. So the facets appear to wobble as the polygon rotates and that condition can cause scan-to-scan spot position errors at the surface to be scanned (subsequently referred to as the photoreceptor).

In order to compensate, some early scanners included a wobble-correcting cylinder lens in a post-facet position between the polygon and the photoreceptor. Sometimes referred to as a positive pyramid error compensating cylinder lens, it helped focus a beam reflected by the facet along a desired scan line at the photoreceptor despite alignment errors in the cross-scan plane between adjacent facets. In that regard, the plane containing both the light beam and the scan line is referred to as the scan plane while a perpendicular plane containing the central position of the light beam (i.e., the position occupied by the light beam when it is directed toward the center of the scan line) is referred to as the cross-scan plane. The cylinder lens had little or no power in the scan direction so that it had essentially no effect in the scan plane, but it had power in the cross-scan direction and so sagittal field curvature was objectionable, especially as the scan angle increased with a decrease in facet-to-photoreceptor distance.

Some scanners had no optics between the facet and the photoreceptor to correct for field curvature (i.e., to flatten the field). Others simply adapted known optical designs, such as those referred to as the Cooke Triplet and the Double Gauss. But then the two-element "f-theta" lens appeared (f representing the focal length and theta the scan angle). It helped flatten the field as described in U.S. Pat. Nos. 4,108,532 (Minoura) and 4,179,183 (Tateoka and Minoura). In addition, using two elements to flatten the field left a free design parameter available for use in correcting some other design problem. It was used to compensate for scanner non-linearity.

Scanner non-linearity refers to the change in spot velocity occurring as the light beam scans across the photoreceptor. That change occurs for a constant polygon rotational rate because the spot on the photoreceptor is farther from the facet at the ends of the scan line than it is at the central position. So, with the f-theta lens configured to compensate for it, such compensation became an attribute that is still sought in post-facet lens systems.

The Minoura patents taught that linearity can be treated as distortion, a known aberration. Therefore, introducing third order barrel distortion of the proper amount cancels the third order term of spot velocity. Then, to third order accuracy, the spot velocity is constant with constant angular velocity. Hence the term "f-theta" instead of "f-tangent theta," which was the case before introduction of the f-theta lens.

Although the f-theta lens flattened the field and compensated for scanner non-linearity, compensation for wobble was left to other means. As a result, many existing scanners include a two-element f-theta lens and a wobble correcting element, for a total component count of three. In addition to the drawback of increased component count, forcing distortion onto the f-theta lens design can be a significant penalty. It can complicate the design, increase cost, and produce unwanted aberrations such as fifth order field curvature. Thus, it is desirable to have some way to simplify scanners in that respect.

SUMMARY OF THE INVENTION

This invention solves the problems outlined above by providing a scanner with a post-facet lens system that flattens the field and compensates for wobble without compensating for scanner non-linearity. Thus, the post-facet lens system is less complicated. It is less costly. It avoids the introduction of unwanted aberrations. It removes a major constraint on the design. It can be configured with just two elements, and it still allows non-optical compensation for scanner non-linearity if desired.

Generally, a scanner system constructed according to the invention includes a light source for producing a light beam and scanning means for directing the light beam toward a surface to be scanned, such as that of a photoreceptor, in order to scan the light beam along a scan line across the photoreceptor. Those components may be similar in many respects to the components used in existing scanning systems, the scanning means including a rotatable element with a plurality of light reflecting facets. In addition, the scanner system includes a post-facet lens system interposed between the scanning means and the photoreceptor. But the post-facet lens system differs from existing designs. According to a major aspect of the invention, it includes first and second elements configured to compensate for field curvature and wobble without compensating for scanner non-linearity.

Preferably, just two elements are used and they are so disposed that the light beam passes first through the first element and then through the second element. The first element preferably includes first and second surfaces such that the light beam passes from the first surface of the first element to the second surface of the first element, while the second element includes first and second surfaces such that the light beam passes from the first surface of the second element to the second surface of the second element. The first and second surfaces of each of the first and second elements are configured to compensate for field curvature and wobble.

In one embodiment of the invention, the first surface of the first element is spherical and the second surface is cylindrical, having curvature in the scan plane and essentially no curvature in the cross-scan plane. In addition, the first surface of the second element is spherical while the second surface is toroidal and so configured according to known optical design techniques that it has primary effect in compensating for wobble. From the foregoing and subsequent descriptions, it is apparent that all surfaces could be toroidal, but the foregoing arrangement simplifies certain aspects of the design without significantly impairing performance.

DESCRIPTION OF THE PREFERRED EMBODIMENT

Figure 1:
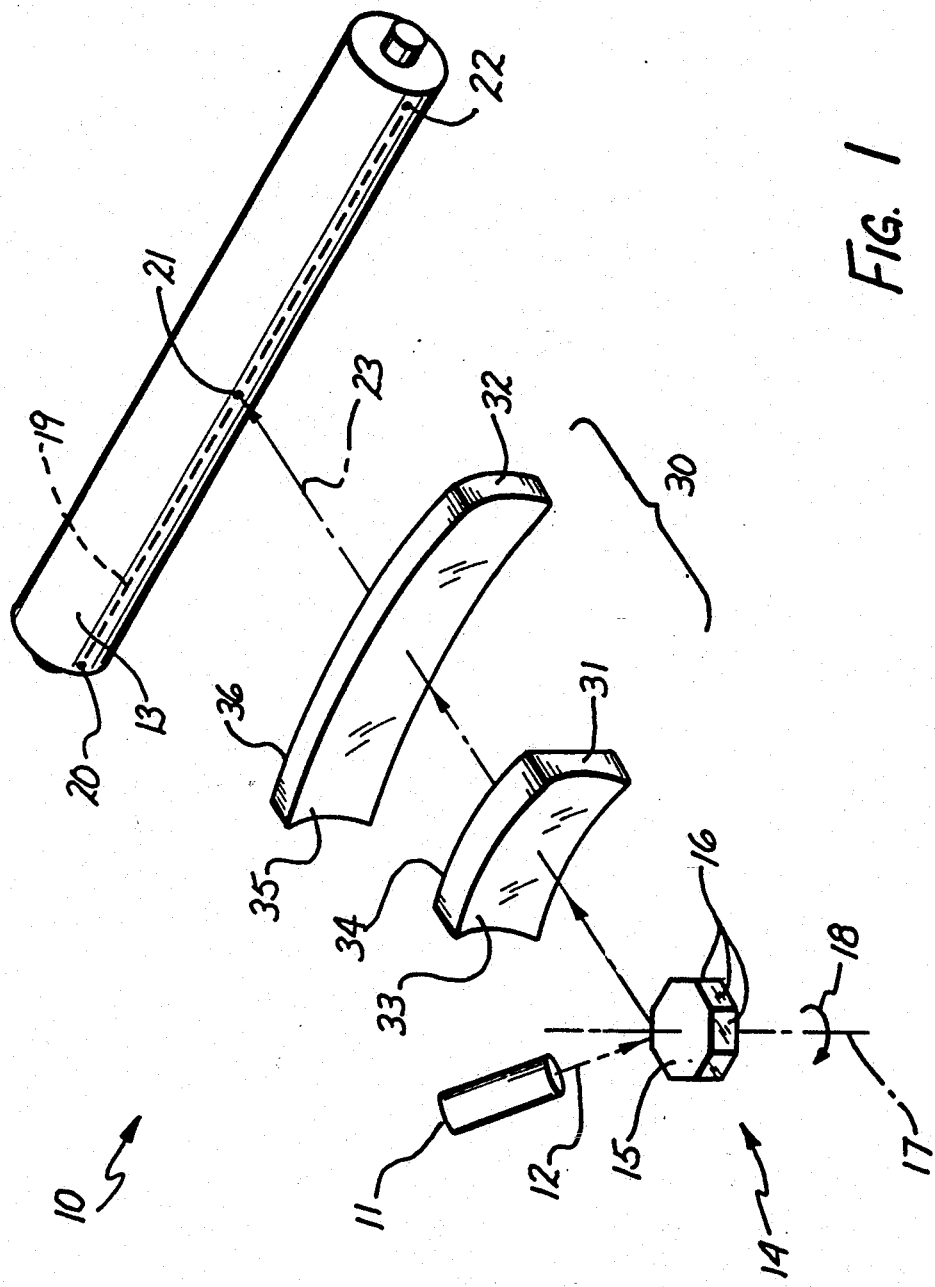
FIG. 1 of the drawings is a diagrammatic representation of a scanner constructed according to the invention.
Figure 2:
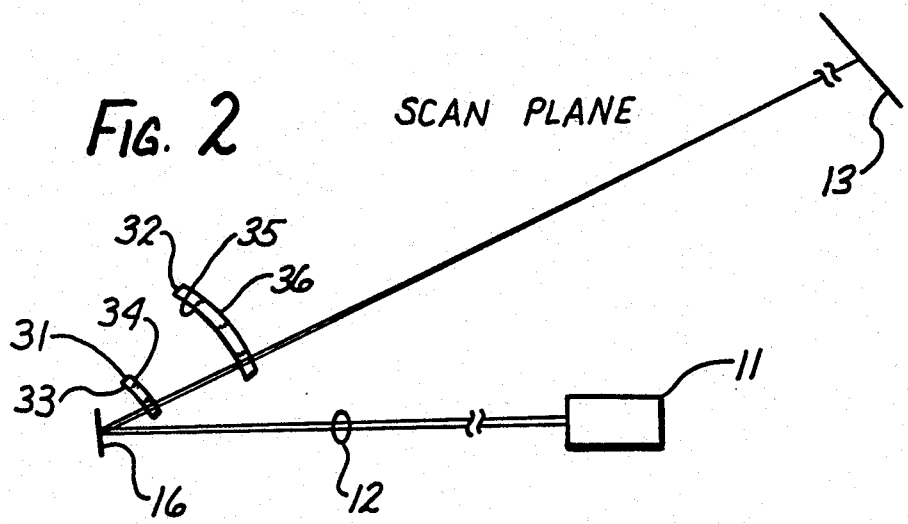
FIG. 2 is a diagrammatic representation of the scanner in the scan plane.
Figure 3:
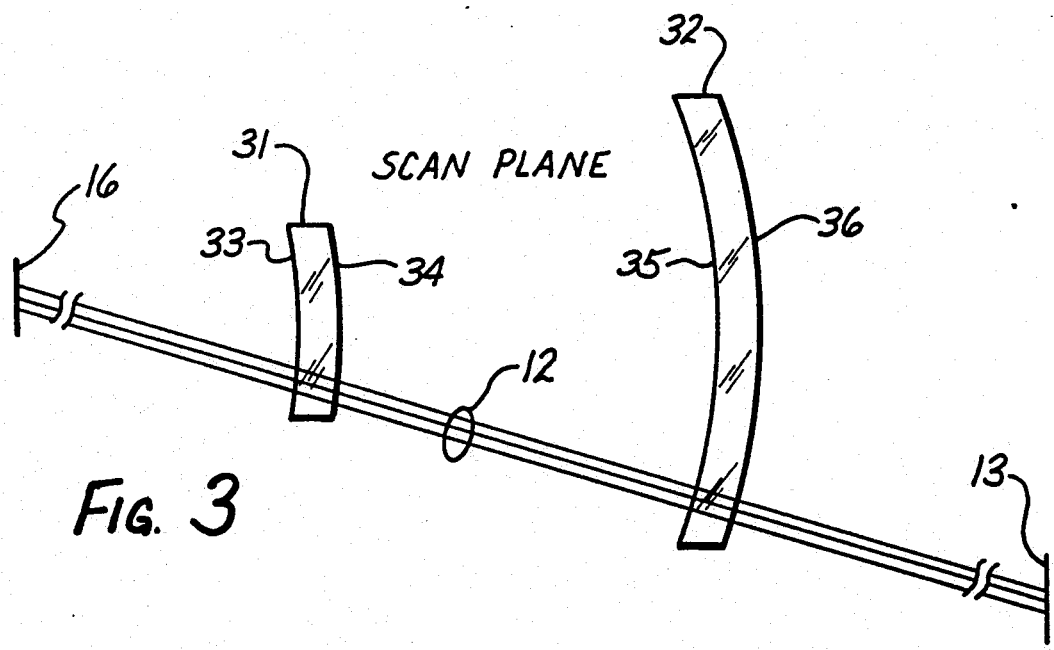
FIG. 3 is an enlarged diagrammatic representation of the post-facet lens system in the scan plane.
Figure 4:
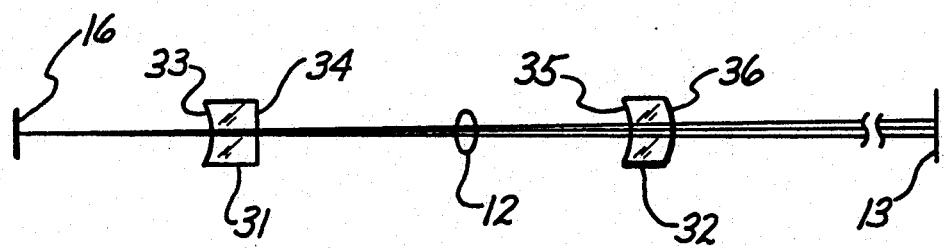
FIG. 4 is a diagrammatic representation of the post-facet lens system in the cross-scan plane.

FIG. 1 illustrates a scanner system 10 constructed according to the invention. Generally, it includes a light source 11 for generating a light beam 12, a photoreceptor 13, and scanning means 14 for scanning the light beam 12 across the photoreceptor 13. The scanning means 14 includes a rotatable element or polygon 15 with a plurality of light reflecting facets 16 (eight facets being illustrated). The scanning means 14 may include other known mechanical components that are depicted in FIG. 1 by the polygon 15 rotating about a rotational axis 17 in the direction of an arrow 18.

As the polygon 15 rotates, the light beam 12 is directed by the facets 16 toward an image plane at the photoreceptor 13, scanning across the photoreceptor 13 in a known manner along a scan line 19 from a first end 20 of the scan line 19 past a center 21 of the scan line and on to a second end 22. Thus, the light beam 12 scans in a scan plane defined as a plane containing both the scan line 19 and a central light beam position 23 that is the position occupied by the light beam when it is directed toward the center 21 of the scan line 19 (i.e., the position of the light beam 12 that is illustrated in FIG. 1). Wobble results in the light beam 12 being directed above or below the scan line 19 in a direction perpendicular to the scan plane. In that regard, a plane containing both the central light beam position 23 and a line perpendicular to the scan plane is referred to as the cross-scan plane (X-scan plane).

The foregoing components may be similar in many respects to corresponding components in existing scanner systems. The light source 11 may include an infrared laser diode and known conditioning optics, for example. It forms a beam at the facets 16 that is collimated in the scan plane and focused in the cross-scan plane. That is done so that the beam has a proper diameter in the scan plane and a proper Numeric Aperture (NA) in the cross-scan plane. In the scan plane, the conditioning optic can be a single aspheric lens of short focal length, for example, or a laser diode collector which is similar to a microscope objective but designed for infrared light and for infinite conjugates. In the cross-scan plane, the optic has the same diode collector, with the addition of a cylinder lens to focus the collimated beam at the facets 16. Many of those things are well known in the art and reference is made to Brueggemann U.S. Pat. Nos. 4,512,625, 4,247,160, 4,230,394, 4,662,709, 4,805,974, 4,682,842, 4,624,528, and 4,595,947 for the various details of scanner system construction provided. For that purpose, reference is also made to Starkweather U.S. Pat. Nos. 4,475,787, 3,995,110, 3,867,571, 4,040,096, and 4,034,408.

A major way the scanner system 10 differs from existing designs is in having a post-facet lens system 30 as subsequently described with reference to FIGS. 1-4.

The post-facet lens system 30 is interposed between the facets 16 and the photoreceptor 13, in the optical path of the light beam 12, and it includes a first element 31 and a second element 32. According to a major aspect of the present invention, the first and second elements 31 and 32 are configured to compensate for field curvature and wobble without compensating for scanner non-linearity. Based on the foregoing and subsequent descriptions, that can be done according to known optical design techniques.

Preferably, the first and second elements 31 and 32 are disposed as illustrated in FIGS. 1-4 so that the light beam 12 passes first through the first element 31 and then through the second element 32. In addition, the first element includes a first surface 33 and a second surface 34 such that the light beam 12 passes from first surface 33 to the second surface 34. Furthermore, the second element includes a first surface 35 and a second surface 36 such that the light beam 12 passes from the first surface 35 to the second surface 36. And, the surfaces 33-36 are so configured that they compensate for field curvature and wobble without compensating for scanner non-linearity.

Preferably, compensation for field curvature and wobble without compensating for scanner non-linearity is accomplished by configuring the first and second elements 31 and 32 of the post-facet lens system 30 according to known optical design techniques so that the first surface 33 of the first element 31 is spherical, the second surface 34 of the first element 31 is cylindrical, the first surface 35 of the second element 32 is spherical, and the second surface 36 of the second element 32 is toroidal. Also, the first surface 33 of the first element 31 is concave, the second surface 34 of the first element 31 is convex in the scan plane and flat in the cross-scan plane, the first surface 35 of the second element 32 is concave, and the second surface 36 of the second element 32 is convex. Moreover, the second surface 36 of the second element 32 is so configured that it has primary effect in correcting for wobble.

Stated another way, the first surface 33 of the first element 31 is spherical, the second surface 34 of the first element 31 has curvature in the scan plane and essentially no curvature in the cross-scan plane, the first surface 35 of the second element 32 is spherical, and the second surface 36 of the second element 32 has a first curvature in the scan plane and a second different curvature in the cross-scan plane. But from the foregoing and subsequent descriptions, it becomes apparent that the first and second elements 31 and 32 and their surfaces 33-36 can be configured in any of various ways according to known optical design techniques to compensate for field curvature and wobble without compensating for scanner non-linearity. All the surfaces 33-36 could be toroidal, for example, and composed of any of various suitable materials, such as the type of glass commonly designated BK7.

Table A shows a prescription for the post-facet lens system 30 while Table B shows a prescription for the scanner system 10.

TABLE A

| Surface | | Radius of Curvature (inches) | Thickness (Inches) | Material | Remarks |
|---|---|---|---|---|---|
| 1 | Scan | −2.764 | 0.250 | BK7 | Spherical |
|   | X-Scan | −2.764 | | | |
| 2 | Scan | −2.113 | 1.980 | Air | Cylinder |
|   | X-Scan | Flat | | | |

TABLE A-continued

| Surface | Radius of Curvature (inches) | Thickness (Inches) | Material | Remarks |
|---|---|---|---|---|
| 3 Scan | −3.132 | 0.250 | BK7 | Spherical |
| X-Scan | −3.132 | | | |
| 4 Scan | −3.037 | | Air | Toroidal |
| X-Scan | −0.951 | | | |

TABLE B

| Surface | Radius of Curvature (inches) | Thickness (inches) | Material | Remarks |
|---|---|---|---|---|
| Facet | Flat | 1.000 | Air | |
| 1 Scan | −2.764 | 0.250 | BK7 | Spherical |
| X-Scan | −2.764 | | | |
| 2 Scan | −2.113 | 1.980 | Air | Cylinder |
| X-Scan | Flat | | | |
| 3 Scan | −3.132 | 0.250 | BK7 | Spherical |
| X-Scan | −3.132 | | | |
| 4 Scan | −3.037 | 12.837 | Air | Toroidal |
| X-Scan | −0.951 | | | |
| IMAGE | Flat | | | |

Wavelength: 632.8 nanometer
This design is diffraction limited.

Table B specifies that the design is diffraction limited. That refers to the physical size (FWHM) of the scanning spot produced by the light beam 12 on the photoreceptor 13. Spot size is commonly referred to in terms of dots-per-inch (dpi), the reciprocal of the actual spot size. For example, at 300 dots-per-inch, the actual spot size is 1/300 inches measured at what is commonly referred to as the Full Width Half Max (FWHM). Table A could also specify that the design is diffraction limited without departing from the broader inventive concepts disclosed. That may be done for a selected resolution of 300 dots-per-inch, 400 dots-per-inch, 500 dots-per-inch, or 600 dots-per-inch, for example.

According to another aspect of the invention, the light source 11 is configured to electronically compensate for scanner, non-linearity. The light source 11 may be configured, for example, to include a scanning clock generating device for that purpose as described in Shimada et al. U.S. Pat. No. 4,729,617. That patent is incorporated by reference for the details provided.

Thus, the invention provides a scanner with a post-facet lens system that flattens the field and compensates for wobble without compensating for scanner non-linearity. The post-facet lens system is less complicated. It is less costly. It avoids the introduction of unwanted aberrations. It removes many design constraints that otherwise exist. It can be configured with just two elements, and it still allows non-optical compensation for scanner non-linearity if desired.

From the foregoing, it is apparent that the invention can be used for any of various input and output scanner configurations, including an input scanner used for reading a document or an output scanner used for printing a document. Thus, it is intended that the claims cover both input and output scanners.

I claim:

1. A system for optical scanning of a flat surface comprising:
    a light source for producing a light beam;
    scanning means for scanning the light beam in a scan plane across the flat surface, wherein the scanning means inherently has scanner nonlinearity; and
    first and second lenses having homogeneous index of refraction disposed between the scanning means and the flat surface along the light beam wherein said first and second lens have surface optical geometries in both the scan plane and in a cross scan plane perpendicular to the scan plane that introduce minimum aberrations in the light beam so that in combination effectively compensate for wobble effect of the scanning means and minimize field curvature at the flat surface, the separation between the first and second surfaces of the second lens being substantially uniform in the scan plane;
    said first and second lenses do not compensate for scanning means non-linearity, and the first lens has a concave spherical first surface towards the scanning means and a convex cylindrical second surface towards the second lens, while the second lens has a concave spherical first surface towards the first lens and a convex toroidal second surface towards the flat surface to be scanned, so that the first and second lenses in combination form an optical system which is diffraction limited.

2. A system for optical scanning of a flat surface comprising:
    means for producing a light beam;
    scanning means for scanning the light beam in a scan plane across a flat surface, wherein the light beam scans at a speed that varies across the flat surface;
    optical means interposed between the scanning means and the flat surface along the light beam, wherein said optical means comprises first and second lenses each having homogeneous index of refraction and a surface optical geometry in both the scan plane and in a cross scan plane perpendicular to the scan plane which substantially minimizes wobble effect of the scanning means and minimizes field curvature effects at the flat surface,
    the first lens having a concave spherical first surface towards the scanning means and a convex toroidal second surface towards the second lens, and the second lens having a concave toroidal first surface towards the first lens and a convex toroidal second surface towards the flat surface to be scanned, the separation between the first and second surfaces of the second lens being substantially uniform in the scan plane; and
    means for compensating scanner non-linearity without introducing optical aberrations to the optical means.

* * * * *